US007835920B2

(12) United States Patent
Snyder et al.

(10) Patent No.: US 7,835,920 B2
(45) Date of Patent: Nov. 16, 2010

(54) DIRECTOR INTERFACE FOR PRODUCTION AUTOMATION CONTROL

(75) Inventors: Robert J. Snyder, St. Augustine, FL (US); Alex Holtz, Jacksonville, FL (US); John R. Benson, Jacksonville, FL (US); William H. Couch, Fernandina Beach, FL (US); Marcel Larocque, Jacksonville, FL (US); Richard Todd, Jacksonville, FL (US); Charles M. Hoeppner, Jacksonville, FL (US); Keith Gregory Tingle, Neptune Beach, FL (US); Kevin K. Morrow, Jacksonville, FL (US)

(73) Assignee: Thomson Licensing, Boulogne-Billancourt (FR)

( * ) Notice: Subject to any disclaimer, the term of this patent is extended or adjusted under 35 U.S.C. 154(b) by 2286 days.

(21) Appl. No.: 10/434,458

(22) Filed: May 9, 2003

(65) Prior Publication Data

US 2004/0008220 A1 Jan. 15, 2004

Related U.S. Application Data

(63) Continuation-in-part of application No. 10/208,810, filed on Aug. 1, 2002, and a continuation-in-part of application No. 09/836,239, filed on Apr. 18, 2001, (Continued)

(60) Provisional application No. 60/386,753, filed on Jun. 10, 2002, provisional application No. 60/309,788, filed on Aug. 6, 2001, provisional application No. 60/193,452, filed on Mar. 31, 2000, provisional application No. 60/196,471, filed on Apr. 12, 2000, provisional application No. 60/363,098, filed on Mar. 12, 2002, provisional application No. 60/323,328, filed on Sep. 20, 2001, provisional application No. 60/378,655, filed on May 9, 2002, provisional application No. 60/378,656, filed on May 9, 2002, provisional application No. 60/378,657, filed on May 9, 2002, provisional application No. 60/378,671, filed on May 9, 2002, provisional application No. 60/378,672, filed on May 9, 2002.

(51) Int. Cl.
*G06Q 10/00* (2006.01)

(52) U.S. Cl. .................... 705/1.1; 715/201; 725/135

(58) Field of Classification Search .................. 705/1, 705/1.1; 715/201; 725/135
See application file for complete search history.

(56) References Cited

U.S. PATENT DOCUMENTS 4,232,311 A 11/1980 Agneta
(Continued)

FOREIGN PATENT DOCUMENTS

EP 0 239 884 A1 10/1987
(Continued)

OTHER PUBLICATIONS

Burghardt, J., "Das Sony-News-System," *Fernseh Und Kinotechnik*, Vde Verlag Gmbh, vol. 50, No. 11, pp. 641-642 and 644-646 (Nov. 1, 1996).

(Continued)

*Primary Examiner*—Jamisue A Plucinski
*Assistant Examiner*—Sangeeta Bahl
(74) *Attorney, Agent, or Firm*—Robert D. Shedd; Robert B. Levy

(57) ABSTRACT

A director control interface is provided to extract production information from a newsroom information management system and populate a production control system. The director control interface enables the director to build a show, but mitigate errors and check for conflicts during the building process. In an embodiment, the director control interface automatically selects macro elements, which are executed on the production control system. The director can override the selection process and choose the macro elements. The director control interface monitors the newsroom information management system for rundown changes, evaluates the changes, and updates the production control system either automatically or with approval from the director. The director control interface is compatible with any type of newsroom information management system as long as it can extract the requisite information.

11 Claims, 7 Drawing Sheets

Related U.S. Application Data now Pat. No. 6,760,916, application No. 10/434,458, which is a continuation-in-part of application No. 09/634,735, filed on Aug. 8, 2000, now Pat. No. 7,024,677, which is a continuation-in-part of application No. 09/488,578, filed on Jan. 21, 2000, which is a continuation-in-part of application No. 09/482,683, filed on Jan. 14, 2000, now Pat. No. 6,952,221, which is a continuation-in-part of application No. 09/215,161, filed on Dec. 18, 1998, now Pat. No. 6,452,612, application No. 10/434,458, which is a continuation-in-part of application No. 09/822,855, filed on Apr. 2, 2001, now abandoned, application No. 10/434,458, which is a continuation-in-part of application No. 09/832,923, filed on Apr. 12, 2001, now Pat. No. 6,909,874, application No. 10/434,458, which is a continuation-in-part of application No. 10/247,783, filed on Sep. 20, 2002.

(56) References Cited

U.S. PATENT DOCUMENTS

| | | |
|---|---|---|
| 4,242,707 A | 12/1980 | Budai |
| 4,272,790 A | 6/1981 | Bates |
| 4,283,766 A | 8/1981 | Snyder et al. |
| 4,400,697 A | 8/1983 | Currie et al. |
| 4,488,180 A | 12/1984 | Rabinowitz |
| 4,631,590 A | 12/1986 | Yamada et al. |
| 4,689,683 A | 8/1987 | Efron |
| 4,746,994 A | 5/1988 | Ettlinger |
| 4,768,102 A | 8/1988 | O'Gwynn |
| 4,972,274 A | 11/1990 | Becker et al. |
| 4,982,346 A | 1/1991 | Girouard et al. |
| 5,001,473 A | 3/1991 | Ritter et al. |
| 5,036,395 A | 7/1991 | Reimers |
| 5,115,310 A * | 5/1992 | Takano et al. ............... 348/722 |
| 5,148,154 A | 9/1992 | MacKay et al. |
| 5,166,797 A | 11/1992 | Angell |
| B4,746,994 I5 | 2/1993 | Ettlinger |
| 5,189,516 A | 2/1993 | Angell et al. |
| 5,237,648 A | 8/1993 | Mills et al. |
| 5,262,865 A | 11/1993 | Herz |
| 5,274,758 A | 12/1993 | Beitel et al. |
| 5,307,456 A | 4/1994 | MacKay |
| 5,388,197 A | 2/1995 | Rayner |
| 5,420,724 A | 5/1995 | Kawamura et al. |
| 5,434,678 A | 7/1995 | Abecassis |
| 5,442,749 A | 8/1995 | Northcutt et al. |
| 5,450,140 A | 9/1995 | Washino |
| 5,487,167 A | 1/1996 | Dinallo et al. |
| 5,519,828 A | 5/1996 | Rayner |
| 5,537,157 A | 7/1996 | Washino et al. |
| 5,557,724 A | 9/1996 | Sampat et al. |
| 5,559,641 A | 9/1996 | Kajimoto et al. |
| 5,565,929 A | 10/1996 | Tanaka |
| 5,577,190 A | 11/1996 | Peters |
| 5,602,684 A | 2/1997 | Corbitt et al. |
| 5,625,570 A | 4/1997 | Vizireanu et al. |
| 5,659,792 A | 8/1997 | Walmsley |
| 5,659,793 A | 8/1997 | Escobar et al. |
| 5,664,087 A | 9/1997 | Tani et al. |
| 5,680,639 A | 10/1997 | Milne et al. |
| 5,682,326 A | 10/1997 | Klingler et al. |
| 5,724,521 A | 3/1998 | Dedrick |
| 5,737,011 A | 4/1998 | Lukacs |
| 5,740,549 A | 4/1998 | Reilly et al. |
| 5,752,238 A | 5/1998 | Dedrick |
| 5,761,417 A | 6/1998 | Henley et al. |
| 5,764,306 A | 6/1998 | Steffano |
| 5,774,664 A | 6/1998 | Hidary et al. |
| 5,778,181 A | 7/1998 | Hidary et al. |
| 5,788,851 A * | 8/1998 | Kenley et al. ............... 210/739 |
| 5,790,117 A | 8/1998 | Halviatti et al. |
| 5,805,154 A | 9/1998 | Brown |
| 5,826,102 A | 10/1998 | Escobar et al. |
| 5,833,468 A | 11/1998 | Guy et al. |
| 5,852,435 A | 12/1998 | Vigneaux et al. |
| 5,872,565 A | 2/1999 | Greaves et al. |
| 5,875,108 A | 2/1999 | Hoffberg et al. |
| 5,880,792 A | 3/1999 | Ward et al. |
| 5,892,507 A | 4/1999 | Moorby et al. |
| 5,892,767 A | 4/1999 | Bell et al. |
| 5,918,002 A | 6/1999 | Klemets et al. |
| 5,931,901 A | 8/1999 | Wolfe et al. |
| 5,987,501 A | 11/1999 | Hamilton et al. |
| 5,999,912 A | 12/1999 | Wodarz et al. |
| 6,006,241 A | 12/1999 | Purnaveja et al. |
| 6,011,537 A | 1/2000 | Slotznick |
| 6,018,768 A | 1/2000 | Ullman et al. |
| 6,026,368 A | 2/2000 | Brown et al. |
| 6,029,045 A | 2/2000 | Picco et al. |
| 6,038,573 A | 3/2000 | Parks |
| 6,061,056 A * | 5/2000 | Menard et al. ............... 715/704 |
| 6,064,967 A | 5/2000 | Speicher |
| 6,084,581 A | 7/2000 | Hunt |
| 6,084,628 A | 7/2000 | Sawyer |
| 6,119,098 A | 9/2000 | Guyot et al. |
| 6,133,909 A | 10/2000 | Schein et al. |
| 6,141,007 A * | 10/2000 | Lebling et al. ............... 715/792 |
| 6,146,148 A | 11/2000 | Stuppy |
| 6,157,929 A | 12/2000 | Zamiska et al. |
| 6,160,570 A | 12/2000 | Sitnik |
| 6,182,050 B1 | 1/2001 | Ballard |
| 6,188,396 B1 | 2/2001 | Boezeman et al. |
| 6,198,477 B1 | 3/2001 | Kurtze et al. |
| 6,198,906 B1 | 3/2001 | Boetje et al. |
| 6,204,840 B1 | 3/2001 | Petelycky et al. |
| 6,211,869 B1 | 4/2001 | Loveman et al. |
| 6,216,112 B1 | 4/2001 | Fuller et al. |
| 6,223,211 B1 | 4/2001 | Hamilton et al. |
| RE37,342 E | 8/2001 | Washino et al. |
| 6,315,572 B1 | 11/2001 | Owens et al. |
| 6,398,556 B1 | 6/2002 | Ho et al. |
| 6,404,978 B1 | 6/2002 | Abe |
| 6,437,802 B1 | 8/2002 | Kenny |
| 6,441,832 B1 | 8/2002 | Tao et al. |
| 6,442,529 B1 | 8/2002 | Krishan et al. |
| 6,452,612 B1 | 9/2002 | Holtz et al. |
| 6,458,060 B1 | 10/2002 | Watterson et al. |
| 6,469,711 B2 | 10/2002 | Foreman et al. |
| 2002/0170068 A1 | 11/2002 | Rafey et al. |
| 2003/0206720 A1 | 11/2003 | Abecassis |

FOREIGN PATENT DOCUMENTS

| | | |
|---|---|---|
| EP | 0 239 884 B1 | 10/1987 |
| EP | 0 774 756 A2 | 5/1997 |
| EP | 0 774 756 A3 | 5/1997 |
| EP | 0 817 474 A1 | 1/1998 |
| EP | 0 933 893 A1 | 8/1999 |
| GB | 2 323 699 A | 9/1998 |
| WO | WO 87/07108 | 11/1987 |
| WO | WO 98/45789 A1 | 10/1998 |
| WO | WO 98/45792 A1 | 10/1998 |
| WO | WO 99/05821 A2 | 2/1999 |
| WO | WO 99/05821 A3 | 2/1999 |
| WO | WO 01/11627 A | 2/2001 |
| WO | WO 01/52526 A | 7/2001 |

OTHER PUBLICATIONS

English-language translation of Sections 1, 2 and 3.7 of Burghardt, J., "Das Sony-News-System," Fernseh Und Kinotechnik, Vde Verlag Gmbh, 4 Pages (Nov. 1, 1996).

*Avstar and ParkerVision Streamline Broadcast News Production Process: Reducing Costs*, Radio-Television News Directors Association, at http://www.avstarnews.com/news/parker.html, 3 pages (Sep. 29, 1999).
*Avstar BCS*, at http://www.avstarnews.com/products/bcs/bcs_over.html, 2 pages (last visited Oct. 2, 1999).
U.S. Appl. No. 09/482,683, filed Jan. 14, 2000, Holtz et al.
U.S. Appl. No. 09/488,578, filed Jan. 21, 2000, Snyder et al.
U.S. Appl. No. 09/634,735, filed Aug. 8, 2000, Snyder et al.
U.S. Appl. No. 09/822,855, filed Apr. 2, 2001, Holtz et al.
U.S. Appl. No. 09/832,923, filed Apr. 12, 2001, Holtz et al.
U.S. Appl. No. 09/836,239, filed Apr. 18, 2001, Holtz et al.
U.S. Appl. No. 10/247,783, filed Sep. 20, 2002, Holtz et al.
*Avstar Fact Sheet*, at http://www.avstarnews.com/about/facts.html, 2 pages (last visited Oct. 2, 1999).
*Avstar MBS*, at http://www.avstarnews.com/products/mbs/mbs_over.html, 1 page (last visited Oct. 2, 1999).
*Avstar Products*, at http://www.avstarnews.com/products/products.html, 1 pages (last visited Oct. 2, 1999).
*Avstar™ Broadcast Control System*, available at http://www.avstarnews.com/products/bcs/bcs_over.html, 2 pages (last visited Oct. 2, 1999)/.
*Avstar™ Media Browse System*, available at http://www.avstarnews.com/products/mbs/mbs_over.html, 2 pages (last visited Oct. 2, 1999).
*Avstar™ Newsroom Computer System*, available at http://www.avstarnews.com/products/ncs/ncs_over.html 2 pages (last visited Oct. 2, 1999).
*Complete Seamless Integration*, at http://www.play.com/trinityNLE/complete.html, 2 pages (last visited Oct. 14, 1999).
*Edit. Sweet.*, at http://www.play.com/trinityNLE/edit.html (last visited Oct. 14, 1999).
*Gizmos98 Home Page*, at http://www.play.com/products/qizmos/index.html, 2 pages (last visited Oct. 14, 1999).
*GlobalCast Communications, Inc.—Solutions*, GlobalCast Communications, at http://www.gcast.com/solutions.shtml, 2 pages (last visited Oct. 15, 1999).
*GlobeCaster*, at http://www.play.com/products/globecaster/index.html 2 pages (last visited Oct. 14, 1999).
*HP Teams With ISVs to Complete Solution Portfolio for Internet Service Providers*, GlobalCast Communications, at http://www.gcast.com/press/11.shtml, 2 pages (Sep. 28, 1998).
*LeaderPlus*, at http://www.avstarnews.com/products/leader/leader_over.html, 2 pages (last visited Oct. 2, 1999).
*Lucent Technologies and GlobalCast Communications Form Strategic Partnership in Reliable Multicast Market*, GlobalCast Communications, at http://www.gcast.com/press/2.shtml, 2 pages (Aug. 25, 1997).
*Newsroom Computer System*, at http://www.avstarnews.com/products/ncs/ncs_over.html, 2 pages (last visited Oct. 2, 1999).
*Play Incorporated Announces Do-It-Yourself Internet Studio*, at http://www.play.com/news/111698-globecaster.html, 2 pages (Nov. 19, 1998).
*Play Incorporated Announces Trinity Live, A Live Production System Based on Advanced Digital Component Switcher and Real-Time Trinity Architecture*, at http://www.play.com/news/091099.html, 2 pages (Sep. 10, 1999).
*Product Features*, at http://www.play.com/products/globecaster/features.html, 1 page (last visited Oct. 15, 1999).
*Products*, at http://www.play.com/products/index.html, 2 pages (last visited Oct. 14, 1999).
*Products: Trinity*, at http://www.play.com/products/tinity/index/html, 1 page (last visited Oct. 14, 1999).
*Products: Trinity: Digital Effects*, at http://www.play.com/products/trinity/digital.html, 2 pages (last visited Oct. 14, 1999).
*Products: Trinity: Editor*, at http://wwww.play.com/products/trinity/editor.html, 1 page (last visited Oct. 14, 1999).
*Products: Trinity: Switcher*, at http://www.play.com/products/trinity/switcher.html, 2 pages (last visited Oct. 14, 1999).
*Products: Trinity: Technical Specifications*, at http://www.play.com/products/trinity/techspecs.html, 1 page (last visited Oct. 14, 1999).
*RealProducer Plus G2*, at http://www.real.com/products/tools/producerplus/index.html, 3 pages (last visited Oct. 15, 1999).
*RealProducer Plus G2 Documentation*, at http://www.real.com/products/tools/producerplus/docs.html, 3 pages (last visited Oct. 15, 1999).
*System Requirements*, at http://www.play.com/products/globecaster/sysreq.html, 1 page (last visited Oct. 15, 1999).
*Technical Engineer Speak Specs*, at http://www.play.com/trinityNLE/tech.html, 2 pages (last visited Oct. 14, 1999).
*Trinity NLE Is Here!*, at http://www.play.com/news/100499.html, 2 pages (last vistited Oct. 15, 1999).
*Trinity University Opens*, at http://wwww.play.com/news/121797.html, 1 page (last visited Oct. 15, 1999).
*Video Production*, at http://www.winningpost.com.au/html/video_production.html, 1 page (last visited Oct. 14, 1999).
Wolfe, M., *Television Stations, Production Companies Appreciate Trinity's Impressive Features, Low Cost*, at http://www.play.com/news/090299.html, 2 pages (Sep. 2, 1999).
Wolfe, M., *USA Today Runs Extensive Story About GlobeCaster*, at http://www.play.com/news/061699.html, 2 pages (Jun. 16, 1999).
*ADC-100*, available at http://www.louth.com/products/adc100_info.htm, 2 pages (Jul. 13, 1998).
Ahanger, G. and Little, T., "Automatic Composition Techniques for Video Production," *IEEE Transactions on Knowledge and Data Engineering*, IEEE, vol. 10, No. 6, Nov./Dec. 1998, pp. 967-987.
*AirBoss: Airtime Broadcast Automation*, [retrieved on Jul. 13, 1998] at http://www.florical.com/airboss.html, 1 pages.
*CameraMan Studio*, CSS-2000-N/P, ParkerVision, Apr. 1997, 2 pages.
*CameraMan Studio System II Broadcast Production Systems*, CSS-2000, CSS-2313, CSS-2017, ParkerVision, Oct. 1997, 2 pages.
Hartford, S., "Overcoming Current Limitations of Personal Computers in Replacing Traditional Video Production Equipment," *SMPTE Journal*, Jan. 1998, pp. 58-64.
Judy, T.A. (Ed.), "AUTOSAT Provides Downlink Control for WKYC," *LOUTH Automation Quarterly News*, vol. 1, Issue 2, Jul. 1997, 4 pages.
Cataldo, C., "Louth Provides the Automation Solution for HBO, New York," *LOUTH Automation Quarterly News*, vol. 1, Issue 3, Oct. 1997, 4 pages.
Judy, T.A. (Ed.), "Louth Provides Satellite Program Acquisition System to CNBC-TV, New Jersey," *LOUTH Automation Quarterly News*, vol. 1, Issue 4, Jan. 1998, 4 pages.
Judy, T.A. (Ed.), "Louth Provides Fully Digital Solution for Foxtel, Australia," *LOUTH Automation Quarterly News*, vol. 1, Issue 5, Mar. 1998, 4 pages.
Judy, T.A. (Ed.), "Telemadrid Chooses Louth for Multi-Channel Automation System," *LOUTH Automation Quarterly News*, vol. 1, Issue 6, Jul. 1998, 4 pages.
Maar, J., "Newscast Without a Crew," Television Broadcast, Oct. 1998, 1 page.
*NewsRepeater: Automated News Channel*, [retrieved on Jul. 13, 1998] at http://www.florical.com/newsrepeater.html, 1 page.
ParkerVision Beta License Agreement for CamerMan STUDIO Systems, ParkerVision, Dec. 19, 1997.
*Presentation Automation, The Powerful and Flexible Windows Based Solution* (Copyright 1995, 1996), [retrieved on Jul. 14, 1998] at http://www.pro-bel.com/corporate/pro-bel_software/products/automation/cp-4000.htm,, 3 pages.
*Pro-Bel Software: Procion AV-Workbench* (Copyright 1995-1998), [retrieved on Jul. 14, 1998] at http://www.pro-bel.com/corporate/pro-bel.ltd/products/ShortForm/page3.htm, 8 pages.
*Product Information* (last revised Jun. 17, 1998), [retrieved on Jul. 13, 1998] at http://www.louth.com/products/index.htm, 1 page.
*Products: Integrated Money Making Systems*, at http://www.florical.com/products.html, 2 pages (last visited Jul. 13, 1998).
*ShowTimer: PreAir Automation*, at http://wwww.florical.com/showtimer.html, 1 page (last visited Jul. 13, 1998).
Slack, P.A. et al., "An Integrated Video Production System," *International Broadcasting Convention*, Sep. 12-16, 1996, pp. 403-408.
*SpotCacher-Video Server and Cache Management*, at http://www.florical.com/spotcacher.html, 1 page (last visited Jul. 13, 1998).
*Station Automation—Now It's a Snap!*(Copyright 1995, 1996), Pro-Bel Ltd., at http://www.pro-bel.com/corporate/pro-bel_software/products/automation, 2 pages (last visited Jul. 14, 1998).

*TimeShifter: Tape/Disk Network Delay*, at http://www.florical.com/timeshifter.html, 1 page (last visited Jul. 13, 1998).

*Video Server Management System* (Copyright 1995, 1996), Pro-Bel Ltd., at http://www.pro-bel.com/corporate/pro-bel_software/products/mapp/, 4 pages (last visited Jul. 14, 1998.

Vigneaux, S., "The Integration of a Newsroom Computer System with a Server-Centred News Production System," *International Broadcasting Convention*, Sep. 12-16, 1996, pp. 512-518.

English-language Abstract of JP 10-065936, published Mar. 6, 1998, from http://www1.jpd1.jpo.go.jp, 2 Pages (last visited May 20, 2002).

"About Yahoo! Broadcast," *Yahoo!® Broadcast* [*online*], *2000* [*retrieved on Apr. 26, 2001*]. *Retrieved from the Internet:URL: http://business.broadcast.com/about_2.html*, 1 page.

"Advantages," *Yahoo!® Broadcast* [online], 2000 [retrieved on Apr. 26, 2001]. Retrieved from the Internet:URL: http://business.broadcast.com/advantages.html, 3 pages.

"Content and Conversation," *Yahoo!® Broadcast* [online], [retrieved on Apr. 26, 2001]. Retrieved from the Internet:<URL: http:business.broadcast.com/sanders_sprint/frameset/html, 1 page.

Festa, P., "Flood of spending due for streaming video," *Yahoo!® News* [online], Apr. 12, 2001 [retrieved Apr. 26, 2001]. Retrieved from the Internet:<URL: http://dailynews.yahoo.com/h/cn/20010412/tc/flood_of_spending_due_for_streaming_video_1.html, 2 pages.

Mannes, G., "Yahoo! Joins Suddenly Crowded Online Music Field," *AOL Personal Finance* [online], Apr. 5, 2001 [retrieved Apr. 26, 2001]. Retrieved from the Internet:<URL: http://aol.thestreet.com/tech/internet/1379000.html, 3 pages.

Mannes, G., "Chasing Sweet Semel of Success Takes Yahoo! to Hollywood," *AOL Personal Finance* [online], Apr. 17, 2001 [retrieved Apr. 26, 2001]. Retrieved from the Internet:<URL: http://aol.thestreet.com/tech/internet/1393298.html, 3 pages.

"Changing the Delivery of Business Communications," *Yahoo!® Broadcast* [online], 2000 [retrieved Apr. 26, 2001]. Retrieved from the Internet:<URL: http://business/.broadcast.com/overview.html, 2 pages.

Weisman, R., "Yahoo's Latest: New Broadcast Site," *Yahoo!® News* [online], Apr. 23, 2001 [retrieved Apr. 26, 2001]. Retrieved from the Internet:<URL: http://dailynews.yahoo.com/h/nf/20010423/tc/9176_1.html, 3 pages.

"Webcasting 101," *Yahoo!® Broadcast* [online], 2000 [retrieved Apr. 26, 2001]. Retrieved from the Internet:<URL: http://business.broadcast.com/webcasting101.html, 3 pages.

"Welcome," *Yahoo!® Broadcast* [online], 2000, [retrieved Apr. 26, 2001]. Retrieved from the Internet:<URL: http://business.broadcast.com/, 1 page.

"Welcome to Yahoo! Broadcast," *Yahoo!® Broadcast* [online], 2001 [retrieved Apr. 26, 2001]. Retrieved from the Internet:>URL: http://mediaframe.yahoo.com/launch?lid-wmv-56-p.902530-41362,wmv-100-p.902531-4136.../index2htm, 1 page.

Wine, W., Dr., "What is I Love TV™?," *iLoveTV Inc.* [online], [retrieved Jun. 12, 2001]. Retrieved from the Internet:>URL: http://209.47.14.231/whatis.html, 1 page.

Humphries, M., "The Options.," *iLoveTV Inc.* [online], [retrieved Jun. 12, 2001]. Retrieved from the Internet:>URL: http://209.47.14.231/possible1.html, 1 page.

Wine, W., Dr., "The Benefits," iLoveTV Inc. [online], [retrieved Jun. 12, 2001]. Retrieved from the Internet:>URL:http://209.47.14.231/benefit.html, 1 page.

"Contact Us," *iLoveTV Inc.* [online], [retrieved Jun. 12, 2001]. Retrieved from the Internet:>URL: http://209.47.14.231/contact.html, 1 page.

"Press Releases," *iLoveTV Inc.*[online], Jun. 5, 2001 [retrieved Jun. 12, 2001]. Retrieved from the Internet:>URL: http://209.47.14.231/press.html, 1 page.

Park, I., "I Love TV: Cutting Edge Technology Unites the Power of Television and the Internet," *iLoveTV Inc.* [online], Jun. 5, 2001 [retrieved Jun. 12, 2001]. Retrieved from the Internet:>URL: http://209.47.14.231/press_cuttingEdge.html, 2 pages.

"Yahoo to Unveil New Broadcast Site," *Yahoo!® News* [online], Apr. 23, 2001 [retrieved Apr. 26, 2001]. Retrieved from the Internet:>URL: http://dailynews.yahoo.com/h/nm/20010423/tc/yahoo_broadcast_dc_1.html, 2 pages.

"Yahoo! Events," *Yahoo!® Events* [online], Apr. 26, 2001 [retrieved Apr. 26, 2001]. Retrieved from the Internet:>URL: http://events.yahoo.com/, 2 pages.

"Welcome to Yahoo! Radio," *Yahoo!® Radio* [online], [retrieved Apr. 26, 2001]. Retrieved from the Internet:>URL: http://radio.broadcast.com/, 2 pages.

\* cited by examiner

DIRECTOR INTERFACE FOR PRODUCTION AUTOMATION CONTROL

CROSS-REFERENCE TO RELATED APPLICATIONS

This application is a continuation-in-part of U.S. application Ser. No. 10/208,810, filed Aug. 1, 2002, by Holtz et al., entitled "Method, System, and Computer Program Product for Producing and Distributing Enhanced Media," incorporated herein by reference in its entirety; which claims the benefit of U.S. Provisional Application No. 60/386,753, filed Jun. 10, 2002, by Holtz et al., entitled "Method, System and Computer Program Product for Producing and Distributing Enhanced Media," incorporated herein by reference in its entirety; as well as the benefit of U.S. Provisional Application No. 60/309,788, filed Aug. 6, 2001 (now abandoned), by Holtz, entitled "Webcasting and Business Models," incorporated herein by reference in its entirety.

This application is a continuation-in-part of U.S. application Ser. No. 09/836,239, filed Apr. 18, 2001, now U.S. Pat. No. 6,760,916 by Holtz et al., entitled "Method, System and Computer Program Product for Producing and Distributing Enhanced Media Downstreams," incorporated herein by reference in its entirety.

This application is a continuation-in-part of U.S. application Ser. No. 09/634,735, filed Aug. 8, 2000, now U.S. Pat. No. 7,024,677 by Snyder et al., entitled "System and Method for Real Time Video Production and Multicasting," incorporated herein by reference in its entirety; which is a continuation-in-part of U.S. application Ser. No. 09/488,578, filed Jan. 21, 2000, by Snyder et al., entitled "System and Method for Real Time Video Production and Multicasting," incorporated herein by reference in its entirety; which is a continuation-in-part of U.S. application Ser. No. 09/482,683, filed Jan. 14, 2000, now U.S. Pat. No. 6,952,221 by Holtz et al., entitled "System and Method for Real Time Video Production and Multicasting," incorporated herein by reference in its entirety; which is a continuation-in-part of U.S. application Ser. No. 09/215,161, filed Dec. 18, 1998 (now U.S. Pat. No. 6,452,612), by Holtz et al., incorporated by reference in its entirety.

This application is a continuation-in-part of U.S. application Ser. No. 09/822,855, filed Apr. 2, 2001, now abandoned by Holtz et al., entitled "Method, System and Computer Program Product for Full News Integration and Automation in a Real Time Video Production Environment," incorporated herein by reference in its entirety; which claims the benefit of U.S. Provisional Application No. 60/193,452, filed Mar. 31, 2000 (now abandoned), by Holtz et al., entitled "Full News Integration and Automation for a Real time Video Production System and Method," incorporated herein by reference in its entirety.

This application is a continuation-in-part of U.S. application Ser. No. 09/832,923, filed Apr. 12, 2001, now U.S. Pat. No. 6,909,874 by Holtz et al., entitled "Interactive Tutorial Method, System and Computer Program Product for Real Time Media Production," incorporated herein by reference in its entirety; which claims the benefit of U.S. Provisional Application No. 60/196,471, filed Apr. 12, 2000 (now abandoned), by Holtz et al., entitled "Interactive Tutorial System, Method and Computer Program Product for Real Time Video Production," incorporated herein by reference in its entirety.

This application is a continuation-in-part of U.S. application Ser. No. 10/247,783, filed Sep. 20, 2002, by Holtz et al., entitled "Advertisement Management Method, System, and Computer Program Product," incorporated herein by reference in its entirety; which claims the benefit of U.S. Provisional Application No. 60/363,098, by Holtz, filed Mar. 12, 2002 (now abandoned), entitled "Sales Module to Support System for On-Demand Internet Deliver of News Content," incorporated herein by reference in its entirety; as well as the benefit of U.S. Provisional Application No. 60/323,328, by Holtz, filed Sep. 20, 2001 (now abandoned), entitled "Advertisement Management Method, System, and Computer Program Product," incorporated herein by reference in its entirety.

This application claims the benefit of U.S. Provisional Application No. 60/378,655, filed May 9, 2002, by Holtz et al., entitled "Enhanced Timeline," incorporated herein by reference in its entirety; U.S. Provisional Application No. 60/378,656, filed May 9, 2002, by Holtz et al., entitled "Director's Interface," incorporated herein by reference in its entirety; U.S. Provisional Application No. 60/378,657, filed May 9, 2002, by Holtz, entitled "Automated Real-Time Execution of Live Inserts of Repurposed Stored Content Distribution," incorporated herein by reference in its entirety; U.S. Provisional Application No. 60/378,671, filed May 9, 2002, entitled "Automated Keying Method, System, and Computer Program Product," incorporated herein by reference in its entirety; and U.S. Provisional Application No. 60/378,672, filed May 9, 2002, by Holtz, entitled "Multiple Aspect Ratio Automated Simulcast Production," incorporated herein by reference in its entirety.

The following United States and PCT utility patent applications have a common assignee and contain some common disclosure:

"System and Method For Real Time Video Production and Multicasting," PCT Patent Application No. PCT/US01/00547, by Snyder et al., filed Jan. 9, 2001, incorporated herein by reference in its entirety;

"Method, System and Computer Program Product for Full News Integration and Automation in a Real Time Video Production Environment," PCT Patent Application No. PCT/US01/10306, by Holtz et al., filed Apr. 2, 2001, incorporated herein by reference in its entirety;

"Real Time Video Production System and Method," U.S. application Ser. No. 10/121,608, filed Apr. 15, 2002, by Holtz et al., incorporated herein by reference in its entirety;

"Method, System and Computer Program Product for Producing and Distributing Enhanced Media Downstreams," PCT Patent Application No. PCT/US02/12048, by Holtz et al., filed Apr. 17, 2002, incorporated herein by reference in its entirety;

"Playlist for Real Time Video Production," U.S. application Ser. No. 10/191,467, filed Jul. 10, 2002, by Holtz et al., incorporated herein by reference in its entirety;

"Real Time Video Production System and Method," U.S. application Ser. No. 10/200,776, filed Jul. 24, 2002, by Holtz et al., incorporated herein by reference in its entirety;

"Method, System and Computer Program Product for Producing and Distributing Enhanced Media," PCT Patent Application No. PCT/US02/24929, by Holtz et al., filed Aug. 6, 2002, incorporated herein by reference in its entirety;

"Advertisement Management Method, System, and Computer Program Product," PCT Patent Application No. PCT/US02/29647, filed Sep. 20, 2002, by Holtz et al., incorporated herein by reference in its entirety; and "Building Macro Elements for Production Automation Control," U.S. application Ser. No. 10/841,618 filed May 10, 2004, by Snyder et al., incorporated herein by reference in its entirety.

BACKGROUND OF THE INVENTION

1. Field of the Invention

The present invention relates generally to media production, and more specifically, to automating production devices during a media production.

2. Related Art

Conventionally, the production of a live or live-to-tape video show (such as a network news broadcast, talk show, or the like) is largely a manual process involving a team of specialized individuals working together in a video production environment having a studio and a control room. The video production environment is comprised of many diverse types of video production devices, such as video cameras, microphones, video tape recorders (VTRs), video switching devices, audio mixers, digital video effects devices, teleprompters, and video graphic overlay devices, etc.

In a conventional production environment, the video production devices are manually operated by a production crew (which does not include the performers and actors, also known as the "talent") of artistic and technical personnel working together under the direction of a director. A standard production crew is made up of nine or more individuals, including camera operators (usually one for each camera, where there are usually three cameras), a video engineer who controls the camera control units (CCUs) for each camera, a teleprompter operator, a character generator operator, a lighting director who controls the studio lights, a technical director who controls the video switcher, an audio technician who controls an audio mixer, tape operator(s) who control(s) a bank of VTRs, and a floor director inside the studio who gives cues to the talent.

Typically, the director coordinates the entire production crew by issuing verbal instructions to them according to a script referred to as a director's rundown sheet. Generally, each member of the production crew is equipped with a headset and a microphone to allow constant communication with each other and the director through an intercom system. The video produced by crew is delivered or transmitted to a master control system that, in turn, broadcasts the video over traditional mediums to a television set. Traditional mediums include the appropriate ranges of the frequency spectrum for television, satellite communications, and cable transmissions. The global Internet and other computer networks present an alternative distribution medium for video productions and like.

During the execution of a live or live-to-tape video show, the production crew must perform multiple parallel tasks using the variety of video production devices. Furthermore, these tasks must all be coordinated and precisely synchronized according to very strict timing requirements. Coordination between the production crew, the director and the talent is vitally important for the successful execution of a show. Accordingly, the logistics of executing a show are extremely difficult to plan and realize.

In the early days, producer rundowns were created manually on paper as a form of putting together the show. New technology allows for this process to be used in networked computers. Companies such as iNEWS™ (i.e., the iNEWS™ news service available on the iNews.com website), Newsmaker, Comprompter, and the Associated Press (AP) have developed news automation systems to manage the workflow processes associated with a newsroom operation. A news automation systems is a network-based service that aggregates stories from news services, such as AP, Konas, and CNN services, police and fire information systems, and field reporters. During a news automation process, all components of a news production (including wire services, assignment editor, reporters, editors, producers, and directors) are connected so that the show building process can be streamlined with file sharing, indexing and archiving by show names. A news automation system allows a producer or director to develop a rundown sheet and always know the status of stories during the rundown assembly process. However, if a news automation source changes or becomes unavailable, the director must be able to quickly adjust the rundown to avoid errors on the air.

Thus, a significant problem with today's conventional production environment is the director must be able to quickly assign sources while executing the show. During a live production, production equipment may fail to operate or members of the crew or talent may miss their cues. The director must be able to quickly react to these dynamic events.

Therefore, a need exists to develop a technology that addresses these concerns.

SUMMARY OF THE INVENTION

A method, system, and computer program product overcomes the above problems by providing a director control interface that serves as a link between a newsroom information management system and a production control system. A newsroom information management system includes a news automation system, such as those available from iNEWS™, Newsmaker, Comprompter, and the Associated Press. A production control system includes an automated production control environment, such as the embodiments described in the pending U.S. application entitled "Method, System and Computer Program Product for Producing and Distributing Enhanced Media Downstreams" (U.S. application Ser. No. 09/836,239), which is incorporated herein by reference in its entirety.

In embodiments of the present invention, the director control system extracts production information from a newsroom information management system and populates a production control system. The director control interface enables the director to build a show, but mitigate errors and check for conflicts during the building process.

In an embodiment, the director control interface automatically selects macro elements, which are executed on the production control system. The director can override the selection process and choose the macro elements.

The director control interface monitors the newsroom information management system for rundown changes, evaluates the changes, and updates the production control system either automatically or with approval from the director. The director control interface is compatible with any type newsroom information management system as long as it can extract the requisite production information.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable one skilled in the pertinent art(s) to make and use the invention. In the drawings, generally, like reference numbers indicate identical or functionally or structurally similar elements. Additionally, generally, the leftmost digit(s) of a reference number identifies the drawing in which the reference number first appears.

DETAILED DESCRIPTION OF THE INVENTION

Figure 1:
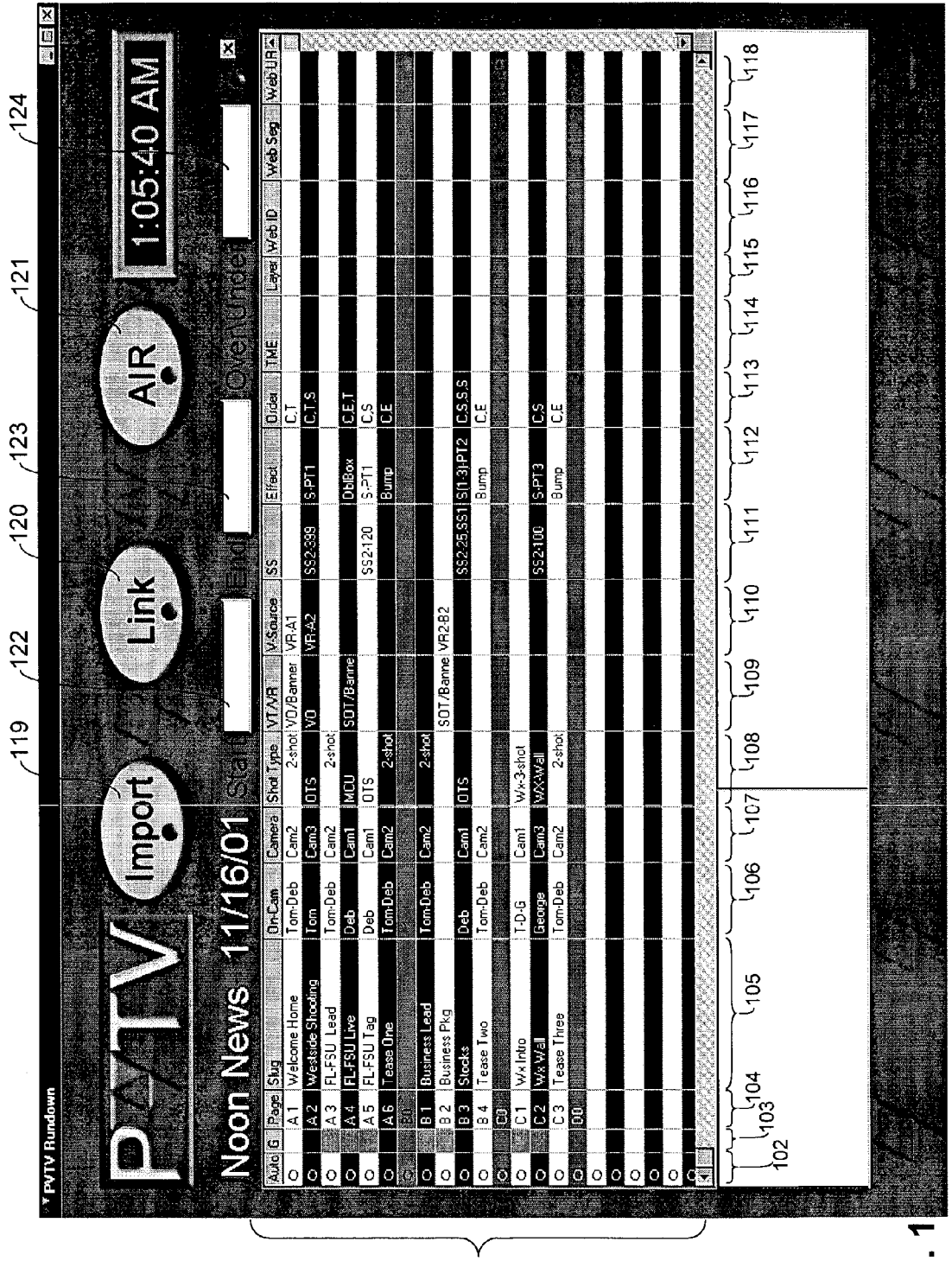
FIG. 1 illustrates a director control interface according to an embodiment of the present invention.

The present invention provides a director control interface for extracting production information from a newsroom information management system (such as, a news automation system available from iNEWS™, Newsmaker, Comprompter, and the Associated Press) and populating a production control system. To produce a show (such as a news program), a producer creates a rundown to select the stories that will be featured on the show. The producer can save the rundown to a rundown file within a newsroom information management system, which allows other personnel involved with the production to gain access to the rundown. An example of a system that integrates a newsroom rundown with a production control system is described in the pending U.S. application entitled "Method, System and Computer Program Product for Full News Integration and Automation in a Real Time Video Production Environment" (U.S. application Ser. No. 09/822,855), which is incorporated herein by reference in its entirety.

The director for the show uses the producer's rundown file as the basis for creating a director's rundown sheet. The director's rundown sheet comprises multiple elements for producing a show. An element, therefore, comprises a group of commands for instructing a production crew to operate the production equipment and thereby, produce a segment or special effects for a show. An example is a voice-over (VO) element. In this case, several commands are required to execute a VO element or line item on the director's rundown. Specifically, commands are required for a video switcher, audio mixer, teleprompter, and a record/playback device (RPD), such as a videotape recorder/player (VTR) or video server. These commands are "grouped" together to define the VO element.

In an automated production control environment, an element represents a group of commands for automating the control of production equipment without significant human interactions. An example of an automated production control environment is described in the aforementioned U.S. application Ser. No. 09/822,855 as well as pending U.S. application entitled "System and Method for Real Time Video Production and Multicasting" (U.S. application Ser. No. 09/634,735), which is incorporated herein by reference in its entirety. As described in these U.S. applications, an automated production can be managed and controlled by an automation control program, such as the Transition Macro™ multimedia production control program developed by ParkerVision, Inc.

(Jacksonville, Fla.). Hence, an automation control program includes several groupings of commands, representing a macro element or group of macro elements.

Accordingly, the director would create a macro element, comprising all the production commands necessary to represent an element on the show rundown. The macro element is executable to control the designated production devices, and thereby, produce a show segment or special effect, such as an introduction, package and tag segment (INTRO/PKG/TAG), a voice over segment (VO), a sound-on-tape segment (SOT), an over-the-shoulder segment (OTS), a VO/SOT combination, an on camera segment (ON-CAM), or other types of elements or segments of a show.

As used herein, the term "media production" includes the production of any and all forms of media or multimedia in accordance with the method, system, and computer program product of the present invention. A media production includes, but is not limited to, video of news programs, television programming (such as, documentaries, situation comedies, dramas, variety shows, interviews, or the like), sporting events, concerts, infomercials, movies, video rentals, or any other content. For example, a media production can include streaming video related to corporate communications and training, educational distance learning, or home shopping video-based "e" or "t" commerce. Media productions also include live or recorded audio (including radio broadcast), graphics, animation, computer generated, text, and other forms of media and multimedia.

Accordingly, a media production can be live, as-live, or live-to-tape. In a "live broadcast" embodiment of the present invention, a media production is recorded and immediately broadcast over traditional airwaves or other mediums (e.g., cable, satellite, etc.) to a television or the like. At the same time (or substantially the same time), the media production can be encoded for distribution over a computer network. In an embodiment, the computer network includes the Internet, and the media production is formatted in hypertext markup language (HTML), or the like, for distribution over the World Wide Web. However, the present invention is not limited to the Internet. A system and method for synchronizing and transmitting traditional and network distributions are described in the pending U.S. application entitled "Method, System, and Computer Program Product for Producing and Distributing Enhanced Media" (U.S. application Ser. No. 10/208,810), which is incorporated herein by reference in its entirety.

The term "as-live" refers to a live media production that has been recorded for a delayed broadcast over traditional or network mediums. The delay period is typically a matter of seconds and is based on a number of factors. For example, a live broadcast may be delayed to grant an editor sufficient time to approve the content or edit the content to remove objectionable subject matter.

The term "live-to-tape" refers to a live media production that has been stored to any type of record playback device (RPD), including a video tape recorder/player (VTR), video recorder/server, virtual recorder (VR), digital audio tape (DAT) recorder, or any mechanism that stores, records, generates, or plays back via magnetic, optical, electronic, or any other storage media. It should be understood that "live-to-tape" represents only one embodiment of the present invention. The present invention is equally applicable to any other type of production that uses or does not use live talent (such as cartoons, computer-generated characters, animation, etc.). Accordingly, reference herein to "live," "as-live," or "live-to-tape" is made for illustration purposes, and is not limiting.

Additionally, traditional or network distributions can be live or repurposed from previously stored media productions.

In an embodiment, a macro element is imported, or integrated, into an automation control program, such as the Transition Macro™ multimedia production control program developed by ParkerVision, Inc. (Jacksonville, Fla.) that can be executed to control an automated multimedia production system. The Transition Macro™ program is described in the pending U.S. application entitled "System and Method for Real Time Video Production and Multicasting" (U.S. application Ser. No. 09/634,735), which is incorporated herein by reference in its entirety. As described in the aforesaid U.S. application, the Transition Macro™ program is an event-driven application that allows serial and parallel processing of media production commands. The pending U.S. application entitled "Method, System and Computer Program Product for Producing and Distributing Enhanced Media Downstreams" (U.S. application Ser. No. 09/836,239) also describes representative embodiments of a multimedia production environment that is implementable with the present invention, and is incorporated herein by reference in its entirety. As described in the aforesaid U.S. applications, an automated multimedia production environment includes a centralized media production processing device that automatically or semi-automatically commands and controls the operation of a variety of media production devices in analog and/or digital video environments.

The term "media production device" includes video switcher, digital video effects device (DVE), audio mixer, teleprompting system, video cameras and robotics (for pan, tilt, zoom, focus, and iris control), record/playback device (RPD), character generator, still store, studio lighting devices, news automation devices, master control/media management automation systems, commercial insertion devices, compression/decompression devices (codec), virtual sets, or the like. The term "RPD" includes VTRs, video recorders/servers, virtual recorder (VR), digital audio tape (DAT) recorder, or any mechanism that stores, records, generates or plays back via magnetic, optical, electronic, or any other storage media. In an embodiment, the media production processing device receives and routes live feeds (such as, field news reports, news services, sporting events, or the like) from any type of communications source, including satellite, terrestrial (e.g., fiber optic, copper, UTP, STP, coaxial, hybrid fiber-coaxial (HFC), or the like), radio, microwave, free-space optics, or any other form or method of transmission, in lieu of, or in addition to, producing a live show within a studio.

As discussed, a director control interface links a rundown file from a newsroom information management system with a production control system. The director control interface serves as a management tool for extracting the requisite information from a newsroom rundown file (e.g., the producer's rundown) and populating the production control system with the appropriate macro elements. Therefore, the director control interface of the present invention is compatible with any type of newsroom information management system as long as it can extract the requisite production information.

FIG. 1 illustrates a director control interface 100 according to an embodiment of the present invention. Director control interface 100 includes a plurality of page control lines 101(a)-101(n). Each page control line 101(a)-101(n) corresponds to a page or line-item from a newsroom rundown file. Control columns 102-118 includes production information that has been selected from the newsroom rundown file or inputted by the director. Control columns 102-118 includes auto-build column 102, group column 103, page column 104, slug column 105, on-cam column 106, camera column 107, shot type column 108, VT/VR column 109, v-source column 110, SS column 111, effects column 112, order column 113, TME column 114, layer column 115, Web ID column 116, Web segment column 117, and Web URL column 118.

Auto-build column 102 is associated with commands for selecting one or more macro elements that, when executed, control a production control system and produce one or more segments of a media production. In an embodiment, auto-build column 102 automatically builds effects column 112 based on the information in the other control columns 102-118.

Group column 103 allows the director to select and group together multiple page control lines 101(a)-101(n). Page control lines 101(a)-101(n) can be grouped under one story level. Therefore, multiple stories (identified by slug column 105) can be grouped under a single story level. The grouped page control lines 101(a)-101(n) can be moved, deleted, or cached as a group.

A single control line 101(a)-101(n) or a group of control lines 101(a)-101(n) can be stored to a cache button (not shown) that is displayed on director control interface 100. All data associated with the cached page control line 101(a)-101(n) is also stored to the cache button. As such, in an embodiment, one or more cache buttons allow the director to float stories and then re-insert them as needed. When activated, a cache button inserts pages or stories stored at the cache button into the page control lines 101(a)-101(n) and pushes everything else down.

Page column 104 includes an alpha-numeric designator or page number for each page control line 101(a)-101(n). A collection of one or more pages (i.e., page control line 101(a)-101(n)) comprises a story or segment of a media production. As shown, each control line 101(a)-101(n) is sequentially designated as A1, A2, A3, A4, A5, A6, B0, B1, B2, etc. The first character in page column 103 identifies a specific block within a media production. A newscast, for example, is typically assembled into blocks known as A, B, C, and D blocks. A show block can be used identify segments of a media production that can be used to sell advertisements.

Slug column 105 identifies a unique story slug for each page control line 101(a)-101(n). The story slug is unique because the information provided in slug column 105 does not change and therefore, is a constant descriptor of each control line 101(a)-101(n). This can be explained with reference to FIG. 2 and FIG. 3.

Figure 2:
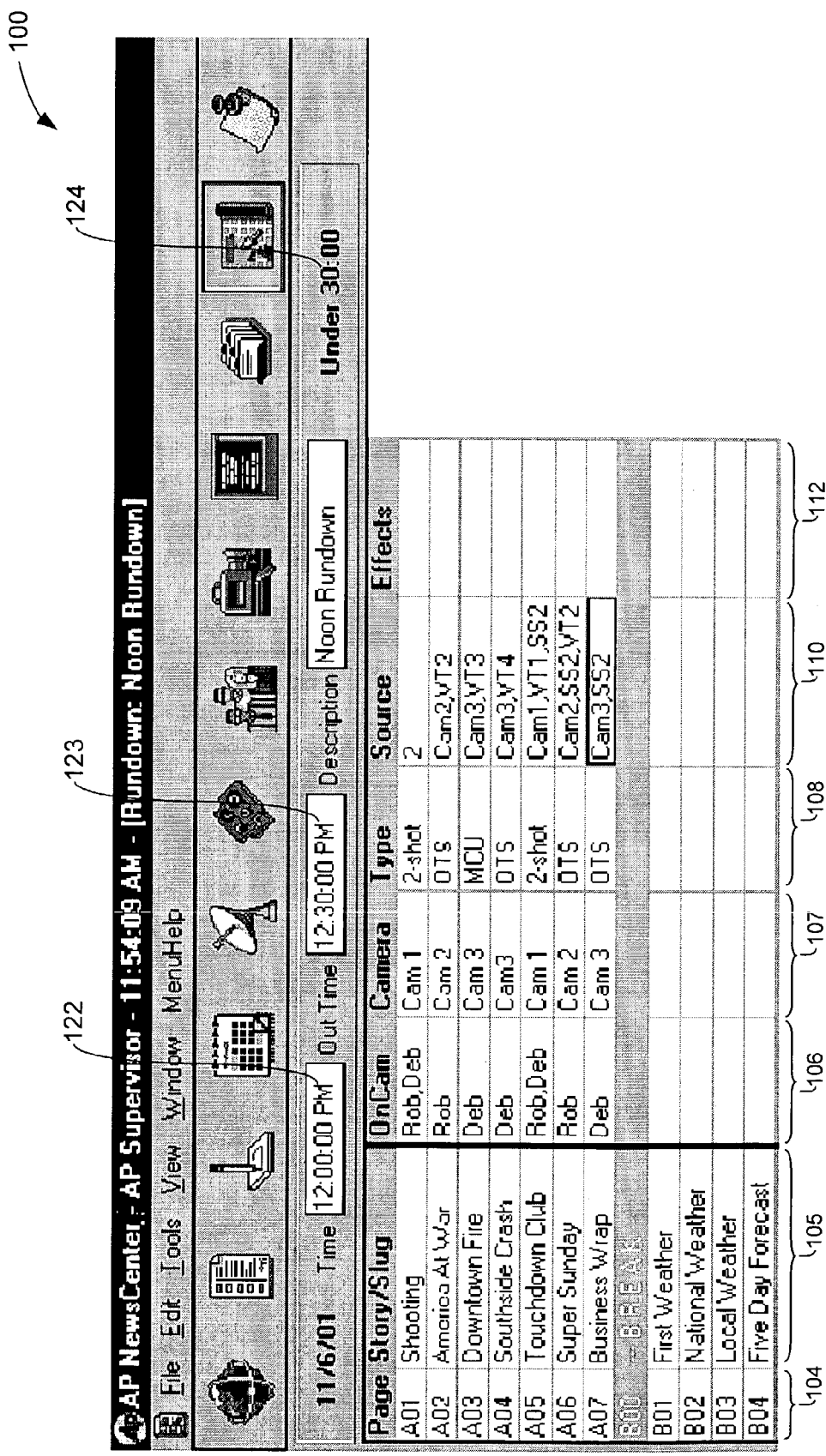
FIG. 2 illustrates a director control interface according to another embodiment of the present invention.
Figure 3:
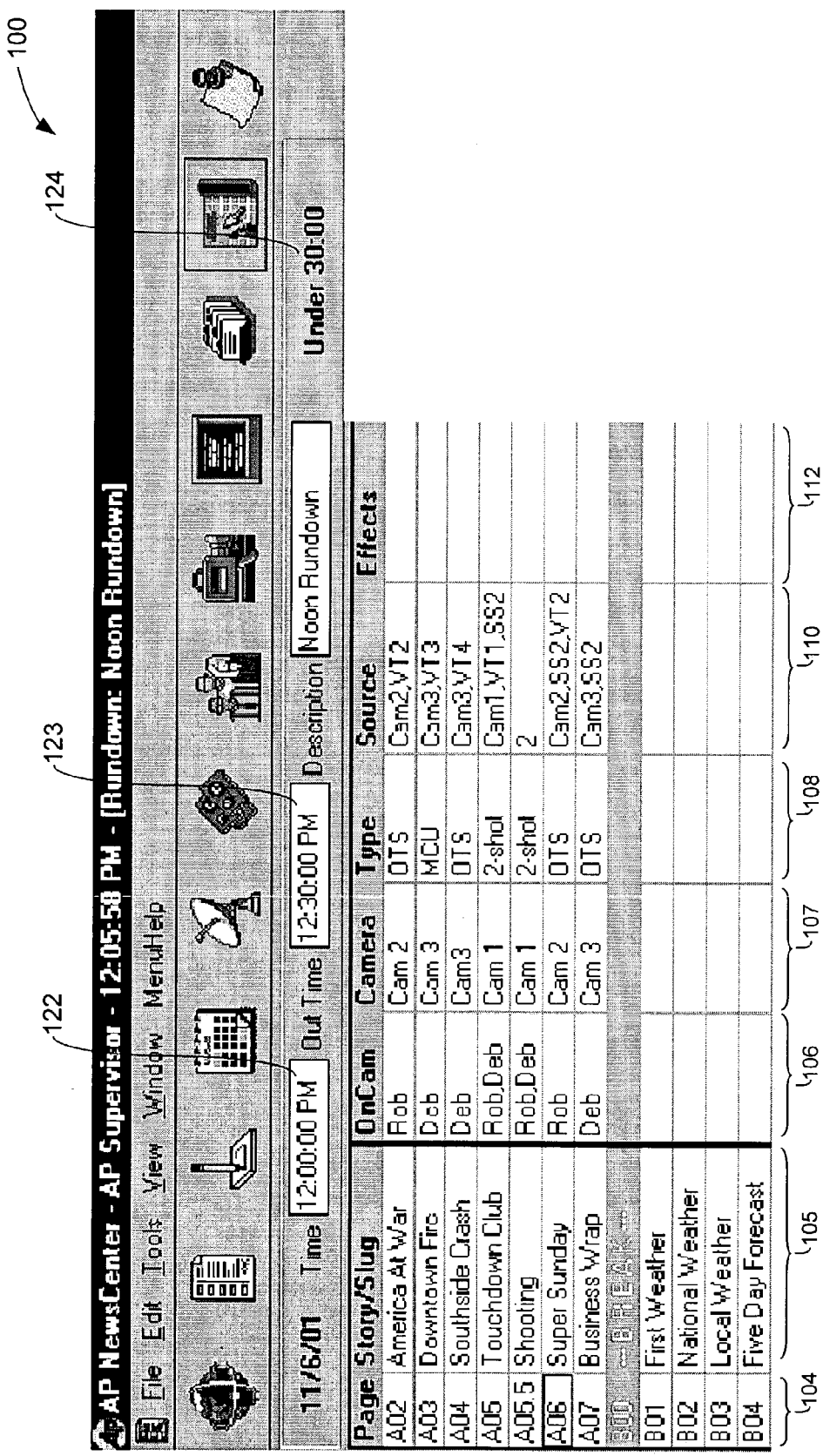
FIG. 3 illustrates a director control interface according to another embodiment of the present invention.

Another embodiment of director control interface 100 is shown in FIG. 2 and FIG. 3. In FIG. 2, the first control line 101(a)-101(n) on director control interface 100 is "A01— Shooting". Specifically, page column 104 reads "A01," and slug column 105 reads "Shooting." FIG. 3 shows another embodiment of director control interface 100, where the producer has moved the "Shooting" slug to another position. The slug is now positioned after the control line 101(a)-101(n) that has a page column 104 reading "A05" and a slug column 105 reading "Touchdown Club." A new control line 101(a)-101(n) has been created and given the designator "A05.5" in page column 104. The new control line 101(a)-101(n) would receive the story slug "Shooting", its script, and all of its production commands, and the previous control line 101(a)-101(n) having the value "A01" in page column 104 no longer exists. As such, the slug value in slug column 105 is unique, and becomes a key field for synchronizing director control interface 101 with the newsroom rundown, as discussed in greater detail below.

Referring back to FIG. 1, on-cam column 106 indicates the talent(s) that will speak or read the story identified by slug column 105. As described in the aforementioned U.S. application entitled "System and Method for Real Time Video Production and Multicasting" (U.S. application Ser. No. 09/634,735), a camera preset and/or audio preset can be established for recording a news anchor. On-cam column 106 allows one or more anchor names to be associated with a preset position. For example, a "News Set" may consist of Talent Position 1, Talent Position 2, Talent Position 3, and Talent Position 4. The anchor name "Deb" can be assigned to Talent Position 1, the anchor name "Tom" can be assigned to Talent Position 2. Director control interface 100 has the ability to equate the names placed in on-cam column 105 with the talent positions on the "News Set."

Camera column 107 indicates the camera source for recording story identified in slug column 105. A primary and secondary camera can be selected. In an embodiment, a dropdown list of available cameras can be reviewed for camera selection. The list depends on the talent position and/or desired special effects or shot types.

Shot type column 108 includes instructions for framing a camera shot. For example, the framing can be a straight shot, over-the-shoulder (OTS) shot, wide shot, or the like. In an embodiment, a dialog box can be opened to display a list of user-defined shot type names that can be selected for entry.

VT/VR column 109 specifies the type of element or segment being produced for the story identified in slug column 105. As discussed above, a segment type includes an INTRO/PKG/TAG, VO, SOT, OTS, VO/SOT combination, ON-CAM, or the like. In an embodiment, a dialog box is opened to display a list of user-defined segment type names that can be selected for entry.

V-source column 110 identifies a machine source and filename. Machine source includes a RPD as described above. The filename can be expressed as a time code, server clip identifier, or the like. V-source column 110 can include one or more filenames for one or more machine sources.

SS column 111 identifies a source and address for a still store or character generator (CG) device. SS column 111 can include one or more sources and/or addresses to a single or multiple store or CG devices.

Effects column 112 indicates the type of transition effects or special effects that are needed for the story identified in slug column 105. The effects include, but are not limited to, fades, wipes, DVE, downstream keyer (DSK) effects, or the like. DVE includes, but are not limited to, warps, dual-box (double box) effects, page turns, music, slab effects, and sequences. DSK effects include DVE and DSK linear, chroma and luma keyers.

In an embodiment, a dialog box is opened to display a list of user-defined effect names that can be selected for entry. An effect can be assigned to an entire page control line 101(a)-101(n). Such global effects include a double box, bump, or the like. An effect can also be assigned to a specific layer of a page control line 101(a)-101(n). For example, a second level entry grid can be opened to allow a director to assign an effect to a particular production layer (e.g., camera, tape, still store, etc.).

Order column 113 indicates the order in which events will occur while producing the story identified in slug column 105. For example, if a page control line 101(a)-101(n) includes a camera shot, tape, and still store. Order column 113 can specify the order as being (CAM, VT, SS), (VT, SS, CAM), (CAM, SS, VT), or the like.

TME column 114 includes an association name or acronym for an association file, which corresponds to one or more macro elements for producing a segment of a media production. In an embodiment, a tool window is opened to allow the director to search for an association name to select the correct macro element. If auto-build column 102 is activated, TME column 114 is left blank and the macro element(s) is automatically selected, as discussed below.

A system and method for selecting and importing association names or acronyms are described in the aforementioned U.S. application entitled "Method, System and Computer Program Product for Full News Integration and Automation in a Real Time Video Production Environment" (U.S. application Ser. No. 09/822,855). Other examples of such systems and methods are described in the pending U.S. application entitled "Method, System, and Computer Program Product for Producing and Distributing Enhanced Media" (U.S. application Ser. No. 10/208,810), which is incorporated herein by reference in its entirety; and in pending U.S. application entitled "Method, System and Computer Program Product for Producing and Distributing Enhanced Media Downstreams" (U.S. application Ser. No. 09/836,239), which is incorporated herein by reference in its entirety.

Layer column 115 includes instructions for keying or compositing layers over a backgound image. In an embodiment, layer column 115 specifies the source(s) for a background, key hole, and key fill. Layer column 115 can also specify a keyer(s), DVE(s), DVE channels, or other related production values.

Web ID column 116 includes post-production distribution instructions for the story identified in slug column 105. As discussed above, a media production can be encoded for distribution over a computer network, such as the global Internet. Web ID column 116 enables the director to associate the story of slug column 105 with a scheduled network distribution. In an embodiment, a combo box is opened to list the available shows for encoding. The director selects one of the available shows to associate with the story identified in slug column 105.

Web segment column 117 identifies a classifier for the story identified in slug column 105. The director can select the classifier from a combo box listing all show segment classifications. In an embodiment, the director can choose from a library of major and minor classifications. For example, a major classification or topic can be sports, weather, headline news, traffic, health watch, elections, or the like. An exemplary minor classification or category can be local sports, college basketball, NFL football, high school baseball, local weather, national weather, local politics, local community issues, local crime, editorials, national news, or the like. Classifications can expand beyond two levels to an unlimited number of levels for additional granularity and resolution for segment type identification and advertisement targeting.

Web URL column 118 allows the director to enter auxiliary information for the story identified in slug column 105. Auxiliary information enhances the value of the story by making available graphics, extended play segments, opinion research data, URLs, advertisements, or the like. Web URL column 118 includes a filename, path, URL, or like address to auxiliary information that is linked to director control interface 100.

The aforementioned list of control columns 102-118 are provided by way of example and not limitation. Additional control columns for selecting requisite production information can be included and are intended to be within the scope of the present invention.

Director control interface 100 also includes an import activator 119, link activator 120, air activator 121, start time field 122, end time field 123, and over/under field 124. Import activator 119 opens a dialog to select and import a rundown file from a newsroom information management system into director control interface 100. Link activator 120 instructs director control interface 100 to monitor the newsroom rundown for changes. Air activator 121 allows the director to approve a page control line 101(*a*)-101(*n*) to be executed on a production control system. Once the production control system starts to execute the macro elements imported from director control interface 100, start time field 122 displays the time the show begins. End time field 123 displays the projected completion time for the show.

Over/under field 124 displays a contemporaneous difference between an updated projected completion time and the originally projected completion time displayed in end time field 123. Each story identified at slug column 105 has an estimated story time. When the macro elements associated with a story starts to execute, the story time for the previous story replaces the estimated time for the previous story with the actual time for the previous story. The updated projected completion time is a measure of the actual duration of all executed stories plus an estimated duration for the stories remaining to be executed. The updated projected completion time minus the value of end time field 123 equals the over/under time reported in over/under field 124.

In an embodiment, director control interface 100 includes a next story button (not shown) and next page button (not shown). The next story button skips to the next story on director control interface 100. As such, the current event is not executed. The next page button skips to the next page number (page column 104), so that the current event is not executed. As discussed above, several pages may compose a single story.

Figure 4:
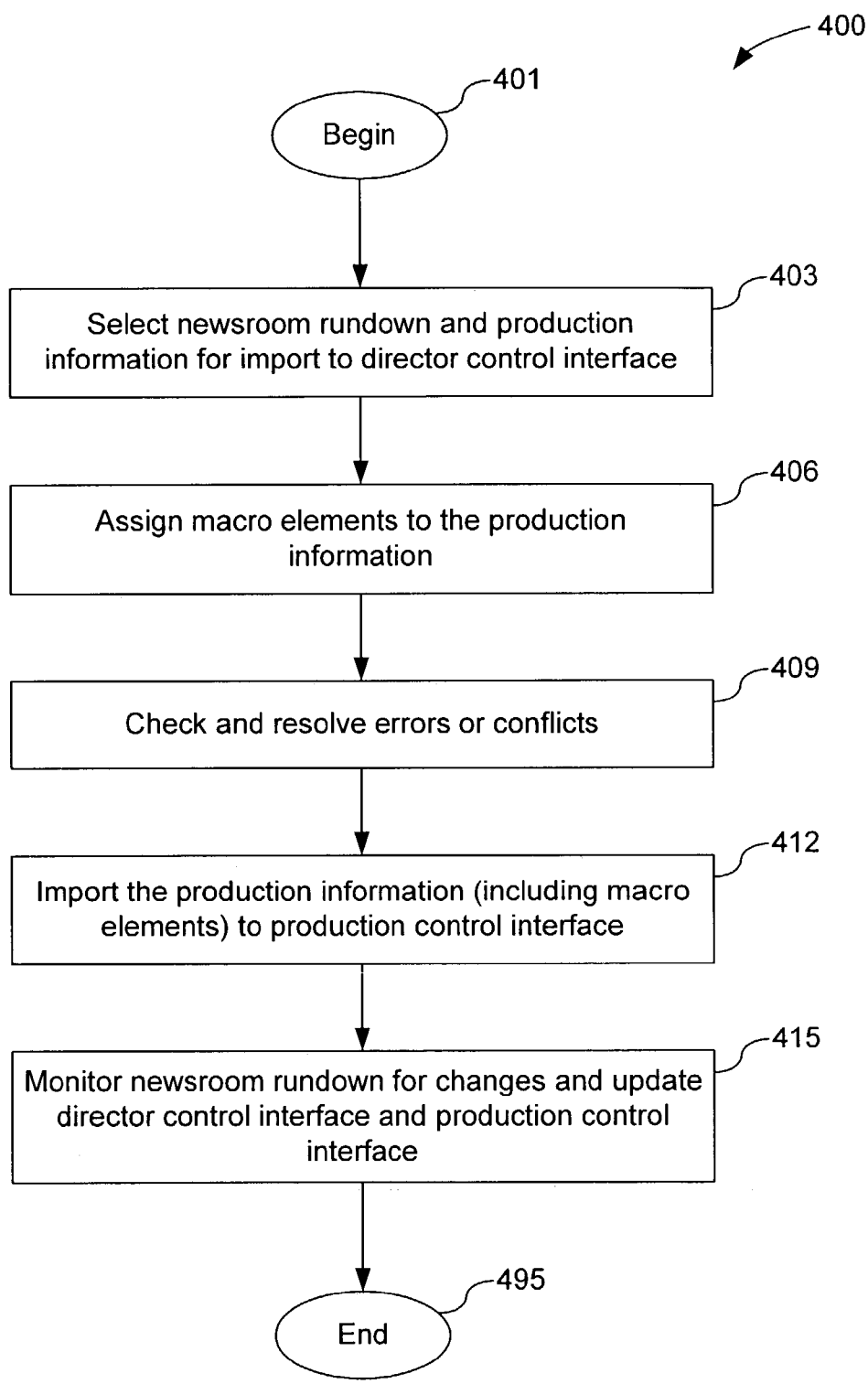
FIG. 4 illustrates an operational flow for building a director control interface according to an embodiment of the present invention.

Referring to FIG. 4, flowchart 400 describes an example of a control flow for building director control interface 100. Specifically, flowchart 400 describes an operational flow for setting production values and macro elements for execution on a production control system, according to an embodiment of the present invention.

The control flow of flowchart 400 begins at step 401 and passes immediately to step 403. At step 403, the director identifies or selects the production information for building a director's rundown for a show. In an embodiment, the production information is based on industry standard terms. Therefore, the present invention can be implemented in various environments without requiring the director to learn a specific jargon.

The production information is collected from a newsroom information management system. As discussed above, a producer selects stories for a show and saves the selections to a newsroom rundown file. Portions of the production information are imported into director control interface 100 from a newsroom rundown. In an embodiment, dialog is opened to select a path to the newsroom rundown. Thus, the dialog would contain a tree of rundown files and dates prepared and saved by the producer.

Once imported, the newsroom rundown populates the page control lines 101(*a*)-101(*n*) of director control interface 100. At a minimum, the field values in page column 104, slug column 105, and on-cam column 106 are extracted from the newsroom rundown. The director has the option of extracting additional field values (such as, tape, stills, OTS, etc.), as needed to build each story. The director must also specify or confirm a running order of stories by block, page number, and unique slug name.

As discussed above, director control interface 100 has two modes of operation. In manual mode, the director manually selects macro elements for a story. In auto-build mode, director control interface 101 automatically builds macro elements for a story. The mode determines the type of production information that must be extracted from the newsroom rundown or completed by the director.

For auto-build mode, the following fields must be imported or completed on director control interface 100. Auto-build column 102 must be activated. Page column 104, slug column 105, on-cam column 106, camera column 107, shot type column 108, v-source column 110, SS column 111, effects column 112, Web ID column 116, Web segment column 117, and Web URL column 118 must be completed with the requisite data.

For manual mode, the following fields must be imported or completed. Auto-build column 102 must be deactivated. Page column 104, slug column 105, on-cam column 106, camera column 107, shot type column 108, VT/VR column 109, v-source column 110, SS column 111, effects column 112, order column 113, TME column 114, layer column 115, Web ID column 116, Web segment column 117, and Web URL column 118 must be completed.

After the production information has been imported or completed, control passes to step 406. At step 406, one or more macro element files are identified or selected for each story that is uniquely identified at slug column 105. If manual mode is set at step 403, the director would input the association names for the appropriate macro element file. If, however, auto-build mode is set at step 403, functions or routines associated with auto-build column 102 are executed to select the appropriate macro element files. In an embodiment, a library of macro elements is indexed by production field values. The auto-build functions or routines are executed to search the macro element library to find macro element files having production field values that match the production information specified in page control lines 101(*a*)-101(*n*). In an embodiment, each combination of production values has a default macro element file. Some combinations have a secondary choice, third choice, etc.

Auto-building is performed on one page control line 101(*a*)-101(*n*) at a time. At times, a previous page control line 101(*a*)-101(*n*) may need to be changed due to selections made on a current page control line 101(*a*)-101(*n*). For example, assume there are two DVE devices designated as DVE1 and DVE2. Further assume that DVE1 is the only available DVE that can implement a page turn effect. If four keyer layers are used on one page control line 101(*a*)-101(*n*), an auto-build default macro element may be built for DVE1. If on the next page control line 101(*a*)-101(*n*), a similar four keyer layer effect is required and a page turn is needed, the auto-build functions or routines must go back to the previous page control line 101(*a*)-101(*n*) and build effects on DVE2 to allow DVE1 to page turn DVE2 off to transition to the next page control line 101(*a*)-101(*n*).

In an embodiment, the auto-build functions or routines selects macro element files based on a user-defined macro element type. The director specifies the type of macro element file that is desired to be built. The auto-build functions or routines identify the appropriate search fields and query the macro element library for the appropriate macro elements.

In an embodiment, the present invention supports four macro element types, which include a camera macro element type, tape/server macro element type, still store macro element type, effects macro element type. Each macro element type is associated with a combination of different control columns 102-118. A camera macro element type is associated with on-cam column 106, shot type column 108, camera column 107, and effects column 112. A tape/server macro element type is associated with on-cam column 106, VT/VR column 109, v-source column 110, and effects column 112. A still store macro element type is associated with on-cam column 106, SS column 111, v-source column 110, and effects column 112. Finally, an effects macro element type is associated with a camera macro element type, tape/server macro element type, or still store macro element type. Alternatively, an effects macro element type can be a separate macro element type (e.g., Double Box, Bumps, etc.).

After the macro element files have been selected and associated with each story of page control lines 101(a)-101(n), control passes to step 409. At step 409, the page control lines 101(a)-101(n) are checked for errors. In an embodiment, director control interface 100 includes a status column (not shown) that indicates the current state of each page control line 101(a)-101(n). If the production information is complete for a particular page control line 101(a)-101(n), a status light for the status column turns green. If anything is missing, the status light is red. Additionally, if a page control line 101(a)-101(n) does not have sufficient information to auto-build a macro element, the status light turns red and/or TME column 114 turns red.

If a tape/server macro element type or a still store macro element type is assigned and no identifier is given, the status light turns red and/or v-source column 110 or SS column 111 turns red.

In an embodiment, director control interface 100 detects and/or resolves conflicts while it executes the error checking process. For example, when a macro element is automatically assigned to a page control line 101(a)-101(n), the macro element(s) assigned to the previous page control line 101(a)-101(n) is checked for conflicts. If a conflict exists, the conflict is resolved by selecting an alternate macro element. If no alternate macro element is available or has been specified, the story is flagged and/or TME column 114 turns red.

Conflict checking can also be executed for macro elements selected in manual mode. Thus, for auto-build and manual mode, macro elements assigned in TME column 114 for each page control lines 101(a)-101(n) are checked for conflicts with macro elements assigned in a preceding and subsequent page control lines 101(a)-101(n). In an embodiment, a dialog box is opened to create a list of macro elements that cannot go back to back. The dialog box can also include an option for assigning an alternate macro element to be inserted if a conflict arises. Therefore, back-to-back conflicting macro elements are flagged, and if an alternate macro element has been assigned, the alternate macro element is inserted. If an alternate macro element has not been assigned, the status light would turn red and/or TME column 114 would turn red to flag the director.

In an embodiment, shot type column 108 is checked for conflicts. A conflict may arise if two page control lines 101(a)-101(n) specify instructions for back-to-back camera shots that have different field values in shot type column 108. For example, assume that CAM1 has been assigned as a primary camera and CAM 2 has been assigned as a secondary camera for two macro element files. The macro element files are associated with two adjacent page control lines 101(a)-101(n). In other words, an association name for the first macro element file is referenced in TME column 114 for the first control lines 101(a)-101(n). Similarly, an association name for the second macro element file is referenced in TME column 114 for the second page control line 101(a)-101(n). Further, assume that CAM1 has been assigned to execute an OTS camera shot for the first macro element. A different shot type, however, is specified in shot type column 108 for CAM1 in the second macro element. Since CAM1 has been selected to record two distinct back-to-back shot type, it would be difficult to produce a smooth transition between the two macro elements. To resolve the conflict, the secondary camera CAM2 is selected for the second macro element. If no secondary camera had been assigned, the status light would turn red and/or camera column 107 and TME column 114 would turn red.

Referring back to FIG. 4, if the production information passes error checking (including conflict resolution), control passes to step 412. At step 412, the director imports the production information from director control interface to a production control system. Techniques and/or methodologies for importing a newsroom rundown to populate a control interface for a production control system is described in the aforementioned U.S. application entitled "Method, System and Computer Program Product for Full News Integration and Automation in a Real Time Video Production Environment" (U.S. application Ser. No. 09/822,855).

Figure 5:
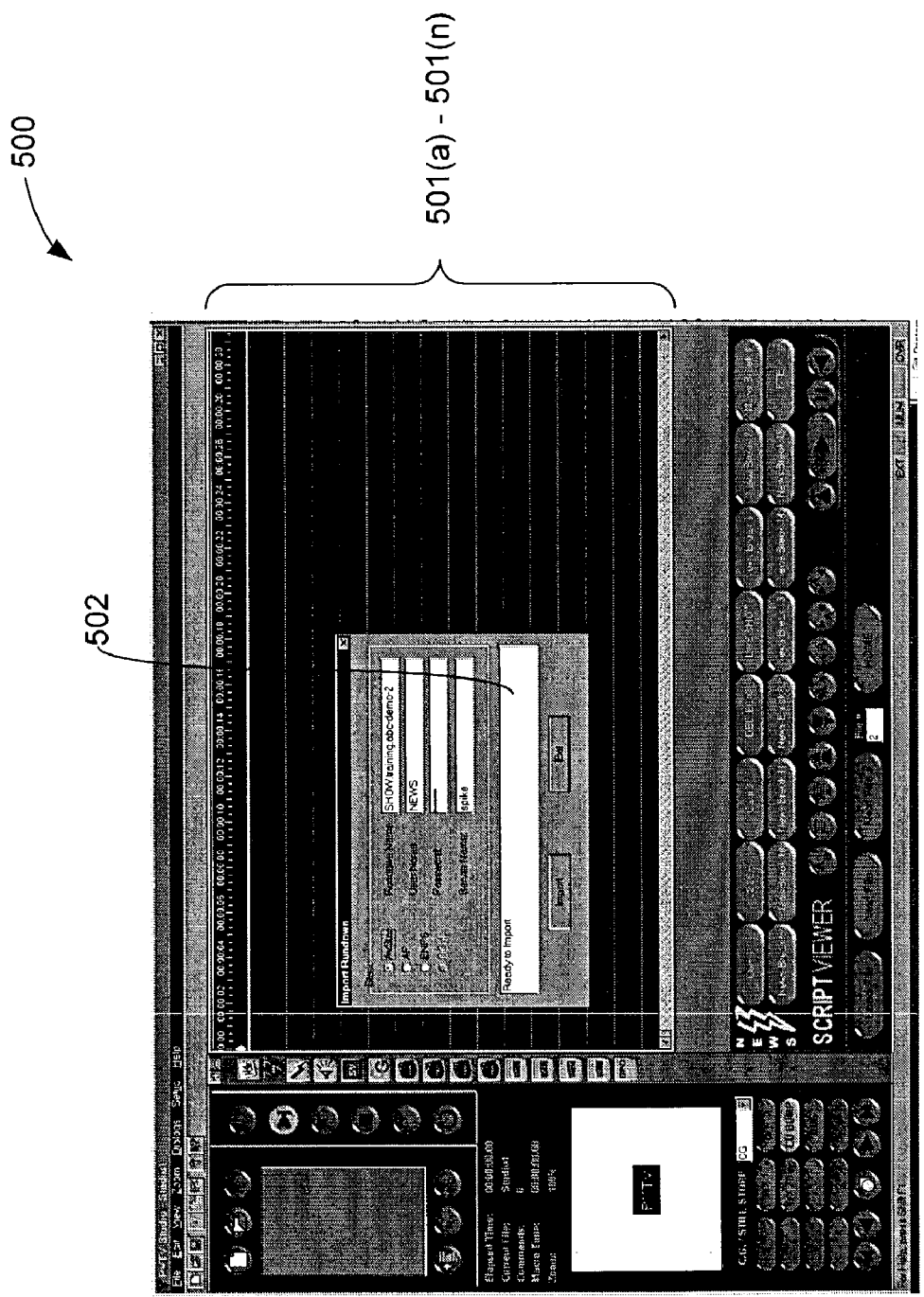
FIG. 5 illustrates a production control interface according to an embodiment of the present invention.

FIG. 5 illustrates a production control interface 500 for a production control system, according to an embodiment of the present invention. Production control interface 500 includes a plurality of control lines 501(a)-501(b). As shown, control lines 501(a)-501(n) have not been populated with production information from director control interface 100. To load the macro element files from director control interface 100, the director, in an embodiment, can activate an icon, use a pull-down menu, or the like to execute an import function. In this embodiment, import window 502, activated from a pull-down tab, identifies the ready-to-air rundown to be converted into macro elements. To activate, the director clicks on the "import" button. During the conversion process, the association names listed in TME column 114 would call up the macro element files.

Figure 6:
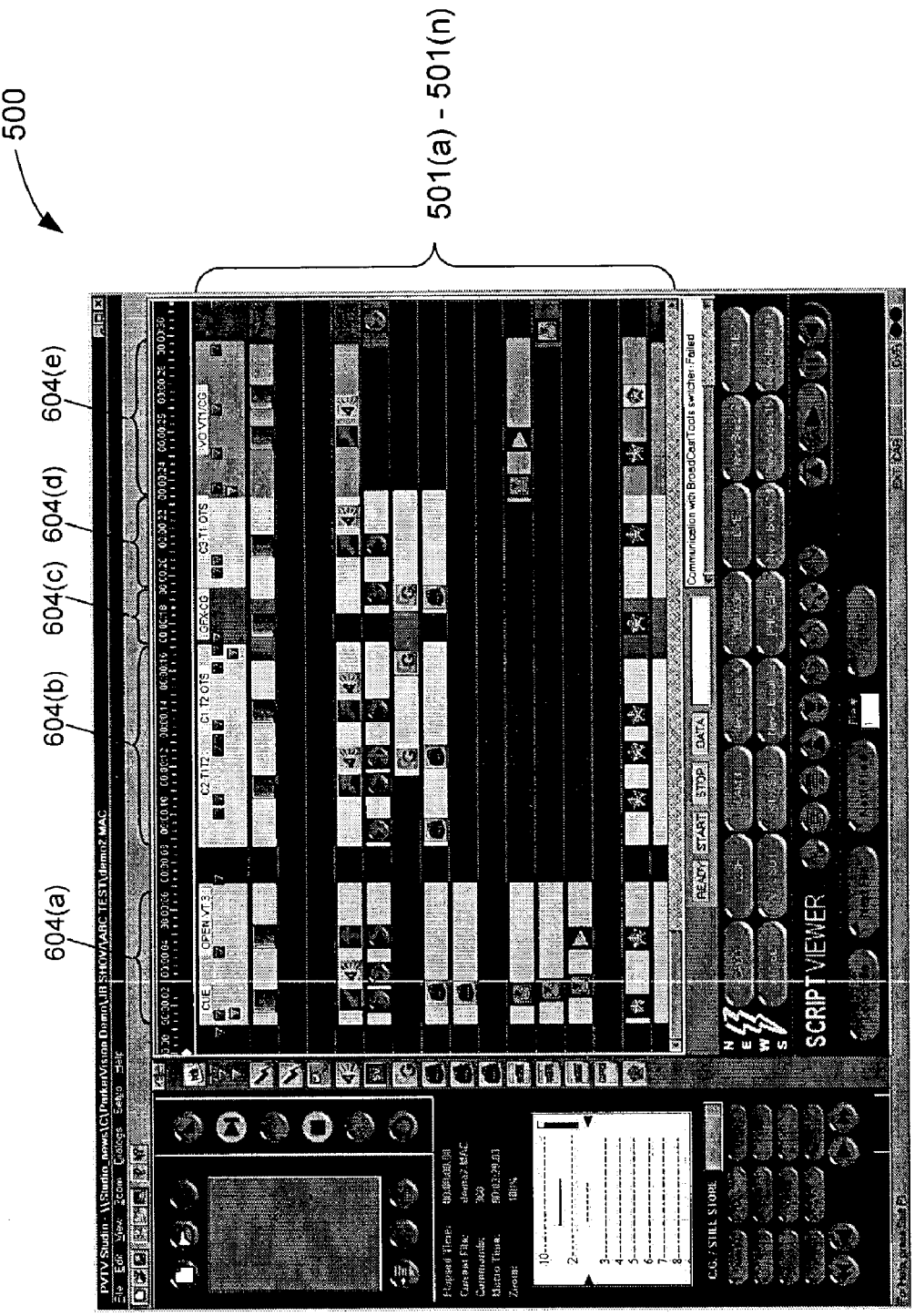
FIG. 6 illustrates a production control interface according to another embodiment of the present invention.

FIG. 6 illustrates another embodiment of production control interface 500. As shown, control lines 501(a)-501(n) have been populated with macro element files following the conversion process. In this embodiment, macro element files 604(a)-604(e) are associated with production commands for five elements from a show rundown. In an embodiment, different colors can be assigned to each macro element file 604(a)-604(e) to allow the director to quickly and visually identify the type of element (e.g., VO, INTRO, SOT, or the like).

Referring back to FIG. 4, control passes to step 415 after the production information has been imported into a production control system (such as, production control interface 500). At step 415, director control interface 100 monitors the newsroom rundown for changes (e.g., from the producer). If changes are detected, the present invention provides mechanisms for updating director control interface 100 and/or production control interface 500. As discussed above, the field value in slug column 105 is unique, and represents a key field for synchronizing director control interface 101 with a newsroom rundown. Hence, the slug field is a key for searching the records of the newsroom rundown on a periodically scheduled basis. The records matching the slug key are compared with the production information corresponding to the page control line 101(a)-101(n) having the same slug value in its slug column 105.

If changes are detected, several courses of action are taken depending on the linking mode. As discussed above, link activator 120 instructs director control interface 100 to monitor the newsroom rundown for changes. Link activator 120 also enables the director to specify the linking mode for correcting or synchronizing director control interface 120. In an embodiment, four linking modes are supported by the present invention. The linking modes include fully linked, timeline approval only, timeline and director interface approval, and fully manual.

In a fully linked mode, changes that are made on the newsroom rundown are automatically updated on director control interface 100. After director control interface 100 has been updated, the changes are evaluated for conflicts. If auto-build has been activated, association names for the macro elements files are selected or updated (if required) in TME column 114. Production control interface 500 is also updated.

If the mode has been set for timeline approval only, changes that are made on the newsroom rundown are automatically updated on director control interface 100. After director control interface 100 has been updated, the changes are evaluated for conflicts. If auto-build has been activated, TME column 114 is updated, if required, with the proper association names for macro element files. However, production control interface 500 is not automatically updated. The director is alerted that changes have been made to director control interface 100. The director is granted an option to accept the changes and update production control interface 500.

If the mode is set for timeline and director interface approval, the changes that are made on the newsroom rundown are not automatically made on director control interface 100. The changes must first be approved by the director. When director control interface 100 has been properly updated, the director must grant authorization to update production control interface 500.

In fully manual mode, the changes that are made on the newsroom rundown are automatically updated on director control interface 100. The director, however, must manually review TME column 114 and select or update the association names for macro elements, if necessary. The director must re-import the production information from director control interface 100 to production control interface 500 to incorporate the changes.

Thus, according to embodiments of the present invention, changes in the newsroom rundown ripples to director control interface 100 and production control interface 500. An anchor read ripple represents an example. A producer may change the talent that has been assigned to read a story or stories. When talent reads are changed, instructions associated with director control interface 100 re-assigns the macro elements for each story line that has changed. Each time a new macro element is selected, the macro element is compared to the previous macro element for conflicts and the next macro element for conflicts. This process continues down the rundown until no conflicts are found or no macro elements are changed.

The director can impose changes onto director control interface 100 by inserting or deleting page control lines 101(*a*)-101(*n*). These changes must also be synchronized with production control interface 500 and the newsroom rundown. For instance, if stories are deleted from director control interface 100 and not from the newsroom rundown, director control interface 100 is no longer synchronized with the newsroom rundown and the link between the two is suspended. If link activator 120 is activated to un-suspend the link, the two rundowns are compared and warnings are issued of any mismatch. The director can decide to accept the newsroom rundown changes or not. If the director chooses to not accept the changes, the link is once again suspended.

If the director inserts cache pages back into director control interface 100, the stories are inserted on director control interface 100, but not on the newsroom rundown. Consequently, director control interface 100 is no longer synchronized with the newsroom rundown, and the link between the two is suspended. If link activator 120 is activated to un-suspend the link, the rundowns are compared and warnings are issued of any mismatch. The director can decide to accept the newsroom rundown changes or not. If the director chooses to not accept the changes, the link is again suspended.

Once the director control interface 100 has been synchronized to any changes in the newsroom rundown, the control flow ends as indicated at step 495.

FIGS. 1-6 are conceptual illustrations allowing an easy explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Figure 7:
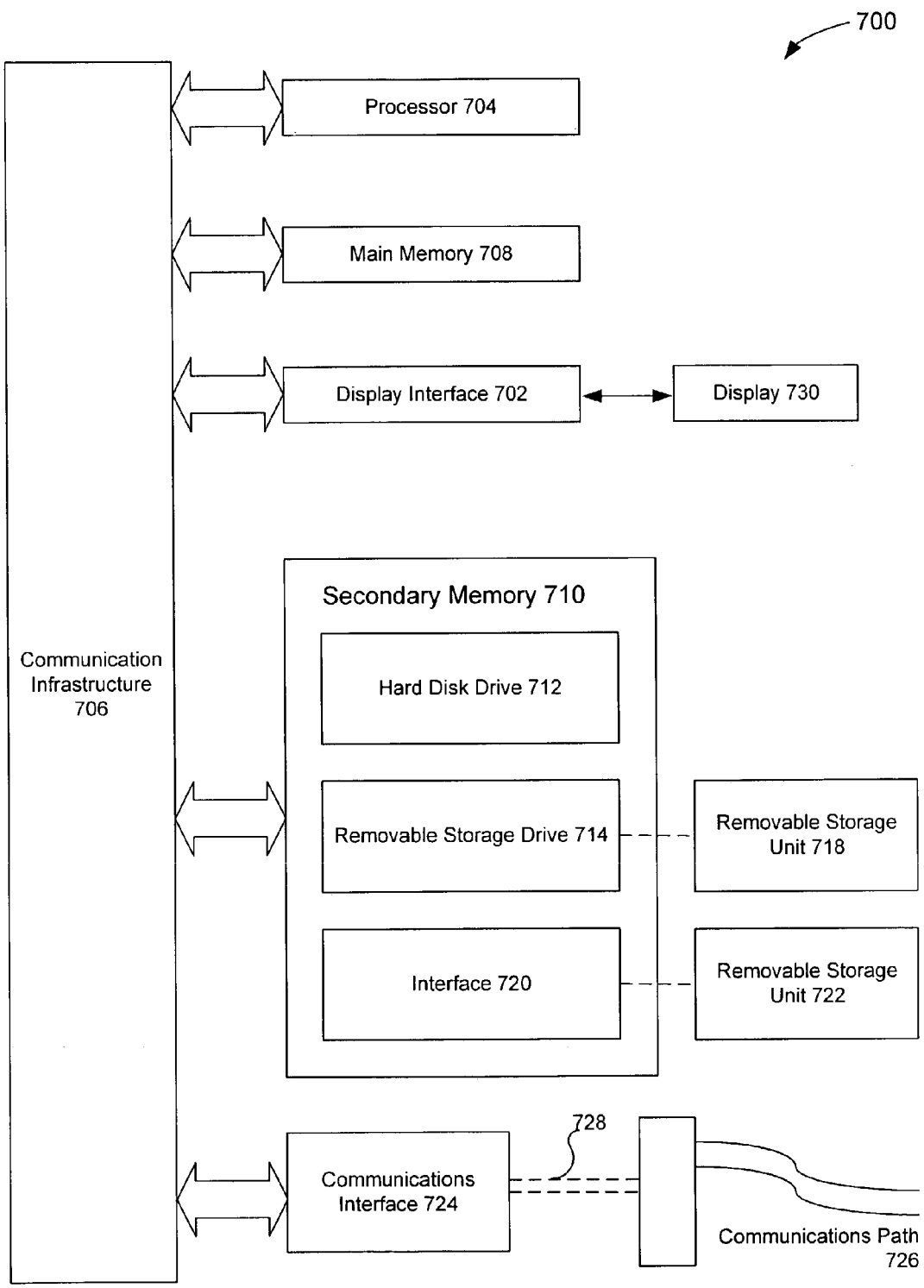
FIG. 7 illustrates an example computer system useful for implementing portions of the present invention.

The present invention can be implemented in one or more computer systems capable of carrying out the functionality described herein. Referring to FIG. 7, an example computer system 700 useful in implementing the present invention is shown. Various embodiments of the invention are described in terms of this example computer system 700. After reading this description, it will become apparent to one skilled in the relevant art(s) how to implement the invention using other computer systems and/or computer architectures.

The computer system 700 includes one or more processors, such as processor 704. The processor 704 is connected to a communication infrastructure 706 (e.g., a communications bus, crossover bar, or network). Various software embodiments are described in terms of this exemplary computer system. After reading this description, it will become apparent to one skilled in the relevant art(s) how to implement the invention using other computer systems and/or computer architectures.

Computer system 700 can include a display interface 702 that forwards graphics, text, and other data from the communication infrastructure 706 (or from a frame buffer not shown) for display on the display unit 730.

Computer system 700 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to removable storage drive 714. As will be appreciated, the removable storage unit 718 includes a computer usable storage medium having stored therein computer software (e.g., programs or other instructions) and/or data.

In alternative embodiments, secondary memory 710 can include other similar means for allowing computer software and/or data to be loaded into computer system 700. Such means can include, for example, a removable storage unit 722 and an interface 720. Examples of such can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 can also include a communications interface 724. Communications interface 724 allows software and data to be transferred between computer system 700 and external devices. Examples of communications interface 724 can include a modem, a network interface (such as an Ethernet card), a communications port, a PCMCIA slot and card, etc. Software and data transferred via communications interface 724 are in the form of signals 728 which can be electronic, electromagnetic, optical, or other signals capable of being received by communications interface 724. These signals 728 are provided to communications interface 724 via a communications path (i.e., channel) 726. Communications path 726 carries signals 728 and can be implemented using wire or cable, fiber optics, a phone line, a cellular phone link, an RF link, and other communications channels.

In this document, the terms "computer program medium" and "computer usable medium" are used to generally refer to media such as removable storage unit 718, removable storage unit 722, a hard disk installed in hard disk drive 712, and signals 728. These computer program products are means for providing software to computer system 700. The invention is directed to such computer program products.

Computer programs (also called computer control logic or computer readable program code) are stored in main memory 708 and/or secondary memory 710. Computer programs can also be received via communications interface 724. Such computer programs, when executed, enable the computer system 700 to implement the present invention as discussed herein. In particular, the computer programs, when executed, enable the processor 704 to implement the processes of the present invention, such as the method(s) implemented using various components of director control interface 100 and production control interface 500 described above, such as various steps of method 400, for example. Accordingly, such computer programs represent controllers of the computer system 700.

In an embodiment where the invention is implemented using software, the software can be stored in a computer program product and loaded into computer system 700 using removable storage drive 714, hard drive 712, interface 720, or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

The foregoing description of the specific embodiments will so fully reveal the general nature of the invention that others can, by applying knowledge within the skill of the art (including the contents of the documents cited and incorporated by reference herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the art.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method of producing a show using a production control system, comprising the steps of:
   (1) identifying production information to build a rundown for the show;
   (2) automatically selecting at least one macro element associated with said production information by searching the macro element library to identify macro element files having production field values that match said production information;
   (3) checking for a conflict associated with the at least one selected macro element and if a conflict exists, select an alternate macro element;
   (4) importing said at least one macro element into the production control system; and
   (5) executing said at least one macro element in the production control system to produce said show.

2. The method according to claim 1, further comprising the step of:
   (5) monitoring a newsroom automation system to detect changes in said production information.

3. The method according to claim 2, further comprising the step of:
   (6) updating said production control system in response to detecting said changes.

4. The method according to claim 3, further comprising the step of:
   (7) prompting for approval prior to executing step (6).

5. The method according to claim 1, further comprising the step of:
   (5) checking for errors in said rundown.

6. The method according to claim 1, further comprising the step of:
   (5) resolving conflicts detected in said rundown.

7. The method according to claim 1, wherein step (2) comprises the steps of
   (a) detecting a macro element type, said macro element type being associated with a combination of production values from said production information; and
   (b) identifying a macro element matching said combination to automatically select said one or more macro elements.

8. The method according to claim 1, wherein step (1) comprises the step of:
   (a) extracting said production information from a newsroom information management system to build said rundown.

9. A system for producing a show, comprising:
   a newsroom information management system for managing workflow within a newsroom environment;
   a director interface for extracting production information from said newsroom information management system, the production information including macro elements, the directors interface including means for automatically selecting at least one macro element by identifying at least one macro element having production values matching said production information; and checking for a conflict associated with the at least one selected macro element and if a conflict exists, select an alternate macro element; and a production control system for receiving said production information including macro elements, said production system monitoring said production information for changes and updating said director interface and executing the selected one macro element corresponding to said production information.

10. The system of claim 9, wherein said director interface comprises means for selecting said one or more macro elements.

11. The system of claim 9, wherein said director interface comprises means for detecting changes between said newsroom information management system and said director interface.

\* \* \* \* \*